United States Patent [19]

Cybulski

[11] Patent Number: 4,607,303
[45] Date of Patent: Aug. 19, 1986

[54] TRIPOD CASSETTE POSITIONING

[75] Inventor: Claude E. Cybulski, St. Paul, Minn.

[73] Assignee: Minnesota Mining and Manufacturing Company, St. Paul, Minn.

[21] Appl. No.: 565,229

[22] Filed: Dec. 27, 1983

[51] Int. Cl.[4] .............................................. G11B 15/00
[52] U.S. Cl. .................................. 360/96.5; 360/132; 360/93
[58] Field of Search .................. 360/93, 94, 96.1, 105, 360/85, 96.5, 96.6; 242/197, 198, 199, 200

[56] References Cited

U.S. PATENT DOCUMENTS

| 3,628,797 | 12/1971 | Ban | 360/93 |
| 4,057,839 | 11/1977 | Banks | 360/93 |
| 4,109,286 | 8/1978 | Katsurayama et al. | 242/198 |
| 4,130,848 | 12/1978 | Amano et al. | 360/93 |
| 4,161,007 | 7/1979 | Haraguchi | 360/105 |

FOREIGN PATENT DOCUMENTS 0656902 9/1964 Fed. Rep. of Germany.

Primary Examiner—John H. Wolff
Assistant Examiner—Andrew L. Sniezek
Attorney, Agent, or Firm—Donald M. Sell; James A. Smith; William B. Barte

[57] ABSTRACT

Cassette recorder has a spring member which fits into a depression in the rear edgewall of a cassette to sense whether the cassette is properly positioned for recording. The depression preferably is a conical receptacle, and the spring member has a rounded pawl which fits into the receptacle. The spring member also forces the cassette forwardly against a pair of positioning pins which have inclined faces to force the front of the cassette against the base plate of the recorder thereby positively positioning the cassette in place, and means connected to the spring member enable recording only when the member is fully seated into the depression.

9 Claims, 3 Drawing Figures

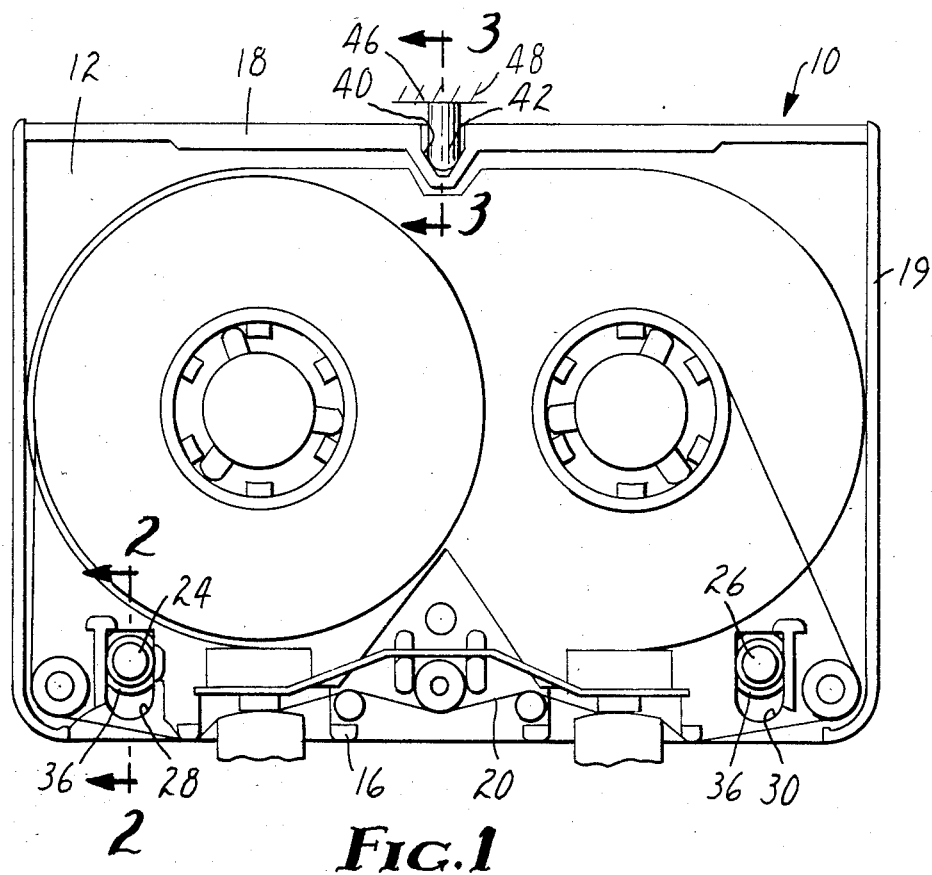
Fig.1
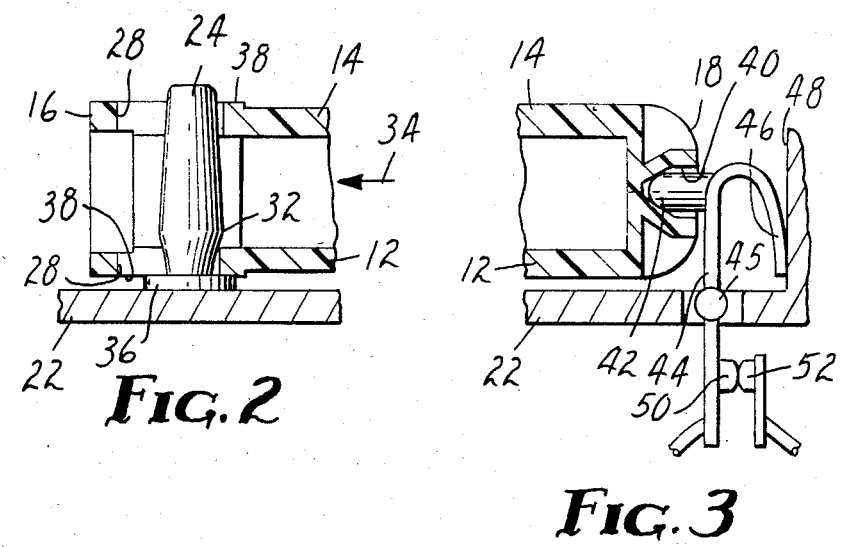
Fig.2
Fig.3

TRIPOD CASSETTE POSITIONING

FIELD OF THE INVENTION

The invention concerns mechanism for positioning recording tape cassettes similar to the Olympus "Microcassette" and the N. V. Philips "Compact Cassette" on a tape deck.

BACKGROUND ART

In all audio cassettes now on the market, the magnetic recording tape travels along the front edgewall which is partially cut away to provide access to the tape. In most audio cassette recorders, a spring contacts the center of the rear edgewall of the cassette to bias it forwardly against a retaining means. In the Olympus "Microcassette" recorder illustrated in FIG. 4 of U.S. Pat. No. 4,352,473 (Satoh et al.), the retaining means is a pair of cylindrical locating pins 52. Although not shown in the patent, each of the locating pins of some recorders is of decreasing diameter toward the base plate so that the force exerted by the spring against the center of the rear edgewall of the cassette is translated almost orthogonally along the tapered locating pins to force the front corners of the cassette toward the base plate. The same spring may extend over the broad top wall of the cassette to exert a biasing force directly toward the base plate thus providing a third point at which the cassette is forced against the base plate. The broad bottom walls of some cassettes have offsets at each of these three points at which molds for making the cassettes have been machined with precision. Some cassette decks have precision reference pads at those three points to provide precision tripod positioning. In spite of such precise positioning, audio cassette decks now on the market do not effectively constrain a mounted cassette from small movements in the plane of those three positioning points. Also, if the spring is damaged or becomes fatiqued, the cassette might not be fully seated at all three positioning points, and the user might not be aware of this.

In most recorders for the larger N. V. Philips "Compact Cassette", a spring member likewise acts against the rear edgewall, but forces the front edgewall against stops. The tape path is located by an elongated boss at each side edgewall which fits into a channel in the deck. The accuracy of such tape positioning depends upon the precision of the plastic housing and its elongated bosses, and since such precision cannot be assured in mass-produced plastic moldings, there can be considerable deviation in tape path from cassette to cassette.

The cassette shown in West German Gebrauchsmuster Pat. No. 1,904,775 issued Nov. 19, 1964 has aligned openings in its broad top and bottom walls for receiving a pair of locating pins 7 and 7a, as in the above-discussed U.S. Pat. No. 4,352,473. However, the spring member 10 fits into a central depression in the rear edgewall and together with washers at the base of each locating pin provides tripod support, assuming that gravity holds the cassette against the washers at the bases of the locating pins 7 and 7a. Nothing is said about this in the Gebrauchsmuster patent.

DISCLOSURE OF INVENTION

The present invention concerns a cassette recorder which like that of the above-discussed West German Gebrauchsmuster patent provides tripod support of a cassette containing recording tape which travels along its front edgewall. Also as in the West German Gebrauchsmuster patent, the top and bottom walls of the cassette are formed with vertically aligned openings near each end of its front edgewall; its rear edgewall is formed with a central depression; and the recorder includes (a) a base plate from which project two locating pins that are received by said openings, (b) a spring member that seats into said depression and biases the cassette against said locating pins, and (c) means for recording said tape.

The cassette recorder of the present invention differs from that of the West German Gebrauchsmuster patent by including means connected to said spring member for enabling recording only when the spring member is fully seated into the depression. In a preferred embodiment of the invention, that enabling means is an electric switch which is normally closed but is opened whenever a cassette is installed and the spring member is not fully seated. Preferably a lamp indicates whether or not that switch is closed.

Preferably the depression is a conical receptacle, and said spring member has a rounded pawl which fits into the receptacle. This effectively locks the rear edgewall of the cassette against either vertical or horizontal movement. Precise positioning is further enhanced as the edges of the locating pins closest to the spring member define an inclined plane which intersects the base plate to form an acute angle in the direction of the spring member so that due to the inclined plane the cassette is forced against the baseplate at the locating pins under the bias of the spring member, thereby positively positioning the cassette in place. This provides precise positioning at three tripod points which define a plane that is oblique to the base plate of the recorder. The cassette thus is effectively constrained in any direction against forces insufficient to overcome the biasing force of the spring member.

In one preferred combination of the invention, each locating pin is circular in cross-section and of decreasing diameter toward the base plate. In another, the locating pins are substantially cylindrical and slightly inclined toward the spring.

As in some cassette recording systems of the prior art, the novel recorder preferably has precision reference pads at the base of each locating pin, while the mold for making the cassette is machined to provide reasonably precise offsets at the two points which contact those reference pads. The offsets preferably project from 0.05 to 1.0 mm beyond each of the top and bottom walls of the cassette. The mold preferably also is machined with precision where the conical receptacle is formed in the rear edgewall of the cassette.

When each locating pin decreases in diameter toward the base plate, the maximum diameter of each (as in some cassette recorders of the prior art) preferably is below the broad top wall of the cassette, and neither pin contacts the top wall when the cassette is in position for recording. Also each of the openings in the broad bottom wall of the cassette preferably is wider than the diameter of its locating pin at the base of the pin. This assures contact between each pin and the rearmost part of each of those openings. While the openings for the locating pins may be elongated orthogonally to the front edgewall, the clearances between the base of each pin and the sides of its opening in the broad bottom wall in the direction of the tape path along the front edgewall are preferably very small to minimize movement of the cassette in that direction. For the same reason, the clearances in the same direction between each pin and the sides of its opening in the broad top wall should likewise be very small.

BRIEF DESCRIPTION OF THE DRAWINGS

In the drawings:

FIG. 1 is a partial schematic plan view of a recording tape cassette, cover removed, positioned on a cassette recorder embodying the invention;

FIG. 2 is a cross-section along lines 2—2 of FIG. 1 with the cover in place; and FIG. 3 is a cross-section along lines 3—3 of FIG. 1 with the cover in place.

DETAILED DESCRIPTION

The cassette 10 shown in FIGS. 1-3 comprises a base and a cover respectively having a broad bottom wall 12 and a broad top wall 14 and together having a front edgewall 16, a rear edgewall 18, and two side edgewalls 19. A recording tape 20 travels along the front edgewall 16.

The cassette is positioned on a tape deck of a cassette recorder, the base plate 22 of which is shown in part. A pair of locating pins 24 and 26 project from the base plate 22 through openings 28 and 30, respectively, in the top and bottom walls of the cassette 10. As seen in FIG. 2, each of the locating pins is circular in cross section and of decreasing diameter from a central point 32 toward its base, so that when a force is applied to the cassette in the direction of the arrow 34 (orthogonally to the front edgewall 16), a precise offset 38 in its bottom wall 12 at each of the openings 28 and 30 is forced downwardly against a precision reference pad 36 on the base plate 22. Above the central point 32, each of the locating pins 24 and 26 is also of decreasing diameter to enhance their passage through the openings 28 and 30. Each of the openings 28 and 30 through each of the top wall 14 and bottom wall 12 is elongated orthogonally to the path of the tape 20 along the front edgewall 16, but is only slightly wider than the diameter of its locating pin in the direction of the tape path when the cassette is positioned on the base plate 22.

The rear edgewall 18 of the cassette 10 is formed with a conical depression or receptacle 40 into which a rounded pawl 42 fits snugly. The pawl is at the end of a flat spring 44 which is pivotably mounted at 45 and is electrically isolated from the base plate 22 of the recorder. The spring 44 is folded so that its free end 46 rests against the backside 48 of the tape deck of the recorder.

Beneath the base plate 22, an electrical contact 50 on the flat spring 44 contacts an electrical contact 52 on the recorder in the absence of a cassette or when the cassette 10 is properly positioned with the pawl 42 seated in the receptacle as shown in FIG. 3. If the cassette 10 were mispositioned, this would break the contacts 50, 52 and disable the recorder. If one were to attempt to load an ordinary cassette having no depression (or a different depression) in its rear edgewall, that would break the contacts and disable the recorder.

SPECIAL APPLICATION

The invention should be especially useful in cassette recorders embodying the recording system disclosed in Australian Patent Specification No. PCT/AU81/190 filed Dec. 16, 1981 entitled "Verification of Recorded Messages". That system simultaneously records audio signals and digital signals which are in part derived from the audio. The digital signals are used on reproduction to authenticate the audio signals. Since that system is intended primarily for use in on-site police investigations, there will often be background noise interfering with audio clarity, and any reduction in audio quality stemming from inaccurate tracking could upon playback produce errors in the derived digital signals. Hence, precise tracking is of utmost importance. Also of utmost importance is the attainment of adequate fidelity on every occasion, because there is no possibility of going back to redo the recording, since the integrity of the system depends upon reliable, on-the-spot recording.

To save development and manufacturing costs, a system such as that of the Australian patent specification should use a cassette which is identical to a commercially available cassette, except being modified by the central depression in the rear edgewall. Since an unmodified cassette would not have the central depression, it could not be used in the Australian system, because the contacts would not close with the cassette in place.

I claim:

1. Cassette recorder for a cassette containing recording tape which travels along its front edgewall, the broad top and bottom walls of the cassette being formed with vertically aligned openings near each end of its front edgewall, and its rear edgewall being formed with a central depression, said recorder comprising (a) a base plate from which project two locating pins that are received by said openings, (b) a spring member that seats into said depression and biases the cassette against said locating pins, and (c) means connected to said spring member for enabling recording only when the spring member is fully seated into the depression, wherein the edges of the locating pins closest to the spring member define an inclined plane which intersects the base plate to form an acute angle in the direction of the spring member so that due to the inclined plane the cassette is forced against the base plate at the locating pins under the bias of the spring member, thereby positively positioning the cassette in place.

2. Cassette recorder as defined in claim 1, wherein said means connected to said spring member comprises a pair of electrical contacts.

3. Cassette recorder as defined in claim 1, wherein each locating pin is circular in cross section and of decreasing diameter toward its base.

4. Cassette recorder as defined in claim 3, wherein each locating pin is of decreasing diameter from its maximum diameter to its free end and does not contact the broad top wall when the cassette is in position.

5. Cassette recorder as defined in claim 4, wherein each of said openings in the broad bottom wall of the cassette is slightly wider than the diameter of its locating pin in the direction of the tape path along the front edgewall.

6. Cassette recorder as defined in claim 5 wherein each of said openings in the broad top wall of the cassette is slightly wider than the diameter of its locating pin in said direction.

7. Cassette recorder as defined in claim 6 having precision reference pads at the base of each locating pin.

8. Cassette recorder as defined in claim 1, wherein the depression is a conical receptacle and the spring member has a rounded pawl.

9. In combination, a cassette recorder as defined in claim 7 and a tape cassette having precise offsets at the two points which contact said reference pads and a precision depression in its rear edgewall, thus providing precise tripod positioning.

* * * * *